United States Patent [19]

Miller et al.

[11] Patent Number: 4,478,264
[45] Date of Patent: Oct. 23, 1984

[54] MORTISING APPARATUS

[75] Inventors: Claud T. Miller; Larry W. Miller, both of Statesville, N.C.

[73] Assignee: McKnight-Miller Company, Inc., Statesville, N.C.

[21] Appl. No.: 407,258

[22] Filed: Aug. 11, 1982

[51] Int. Cl.³ .............................................. B27F 5/02
[52] U.S. Cl. ...................................... 144/83; 144/82; 144/2 R; 144/136 R; 74/22 R; 74/58
[58] Field of Search ..................... 144/2 R, 83, 69, 82, 144/136 R; 74/57, 58, 22 R

[56] References Cited

U.S. PATENT DOCUMENTS

| 263,752 | 9/1882 | Bangs | 144/69 |
| 1,074,598 | 10/1913 | Bradley | 144/69 |
| 2,431,298 | 11/1947 | Nichols | 74/22 |
| 2,432,172 | 12/1947 | Reed et al. | 74/22 |
| 4,343,200 | 8/1982 | Alworth et al. | 74/57 |

Primary Examiner—W. D. Bray
Assistant Examiner—Jorji M. Griffin
Attorney, Agent, or Firm—Richards, Shefte & Pinckney

[57] ABSTRACT

A mortising machine adapted for connection to a conventional electric motor includes a frame having rotatably mounted therein a helically-grooved shaft on which is threadedly mounted a router assembly carrying a rotatable router bit for reciprocation along the grooved shaft upon its rotation. The shaft of the router bit and the grooved shaft are both driven from a drive shaft journaled in the frame by a drive connection arrangement of pulleys and timing belts to simultaneously rotate and reciprocate the router bit for cutting a linear mortised slot. For driving the shaft of the router bit, the drive arrangement includes a pulley on each of the drive shaft and router bit shaft, a traveling idler pulley mounted on an arm pivoted on the router assembly, and a timing belt trained about the pulleys. The traveling pulley is biased by a spring away from the drive shaft into a position relative to the drive shaft and the shaft of the router bit and moves reciprocably with the router assembly against the biasing force of the spring such that the drive arrangement extends and contracts reciprocably with the router assembly, the traveling pulley acting as an idler to maintain tension in the timing belt, thereby to provide a continuous drive connection between the drive shaft and the router bit throughout reciprocation of the router assembly. The frame is substantially enclosed except for a slot through which the router bit extends and reciprocates, a belt arrangement being affixed to the router assembly on opposite sides of the router bit for reciprocation with the router assembly in covering relation to the slot to prevent entrance of debris into the frame.

13 Claims, 8 Drawing Figures

MORTISING APPARATUS

BACKGROUND OF THE INVENTION

The present invention relates to mortising apparatus and particularly to such apparatus adapted for cutting longitudinal mortised slots.

Mortise-and-tenon joints are widely used, particularly in the furniture industry, to provide a reliable mechanical fit between mating parts and a variety of differing apparatus is conventionally employed for the cutting of mortised slots for such joints. Typically, conventional mortising machines are large, self-contained units usable substantially only for boring and cutting mortised holes and slots and, accordingly, such machines represent a relatively large capital investment while providing relative little versatility of use. Representative examples of various types of conventional apparatus of this type are disclosed in U.S. Pat. Nos. 1,574,951; 2,450,181; 2,630,151; 2,644,371; 2,895,516; 4,031,931; and 4,073,324. Of these patents, U.S. Pat. Nos. 2,630,151; 2,644,371; and 4,031,931 are characteristic of the most widely used type of mortising apparatus employed for cutting linear mortised slots, each disclosing a machine employing a unitary motor and cutting bit mounted on a guide track or guide rod arrangement for linear operating reciprocation as a unit.

In contrast, the present invention provides a relatively small mortising apparatus for cutting longitudinal slots having a particular driving arrangement by which its cutting bit may be both rotated and reciprocated operatively by a fixedly mounted drive motor which permits the present apparatus to be adapted in traditional manner in a self-contained mortising machine or to be readily adapted to the stationary drive motors of other types of woodworking or similar machines for portable use as an inexpensive attachment thereto.

SUMMARY OF THE INVENTION

Briefly described, the present mortising apparatus includes a frame, a longitudinal helically threaded shaft rotatably journaled in the frame, a reciprocating arrangement threadedly mounted on the shaft for longitudinal reciprocation therealong upon rotation thereof, a cutting arrangement, preferably including a wood-cutting router bit, rotatably journaled in and extending outwardly from the reciprocating arrangement, a drive shaft rotatably journaled in the frame, and a drive connection arrangement operatively associating the drive shaft respectively with the threaded shaft and the cutting arrangement for simultaneous rotation thereof upon rotation of the drive shaft. In this manner, rotation of the drive shaft causes the reciprocating arrangement to move longitudinally along the threaded shaft while simultaneously causing the cutting arrangement to rotate, thereby for cutting longitudinal slots therewith.

In the preferred embodiment, the drive connection arrangement includes a worm gear arrangement operatively associated with the threaded shaft for effecting rotation thereof and a belt drive arrangement driven by the drive shaft for driving the worm gear arrangement. Another belt drive arrangement is arranged in driving association with the drive shaft and the cutting arrangement for extension and contraction reciprocably with the reciprocating arrangement for rotating the cutting arrangement throughout its reciprocating movement therewith. Such belt drive arrangement includes a pulley fixedly mounted on the drive shaft for rotation therewith, a pulley fixedly mounted on the cutting arrangement for rotation and reciprocation therewith, a traveling idler pulley rotatably mounted on a pulley support arm pivotable coaxially with the cutting arrangement pulley, a drive belt trained about such pulleys, and a biasing arrangement for urging the pulley support arm away from the drive shaft pulley, whereby the support arm pulley is arranged for curvilinear traveling movement in engagement with the drive belt during the reciprocation of the reciprocating arrangement to maintain taut the drive belt as the pulley arrangement extends and contracts.

Preferably, the frame substantially encloses the threaded shaft, the reciprocating arrangement, the cutting arrangement, the drive shaft and the drive connection arrangement and includes a longitudinal opening through which outwardly extends the cutting arrangement for reciprocation therein. A belt strap is affixed to the reciprocating arrangement on opposite sides of the cutting arrangement and is trained interiorly of the frame about a pulley arrangement to move reciprocally with the reciprocating arrangement in covering relation to the longitudinal opening in the frame thereby to prevent entrance of debris into the frame through the opening.

DESCRIPTION OF THE PREFERRED EMBODIMENT

Figure 1:
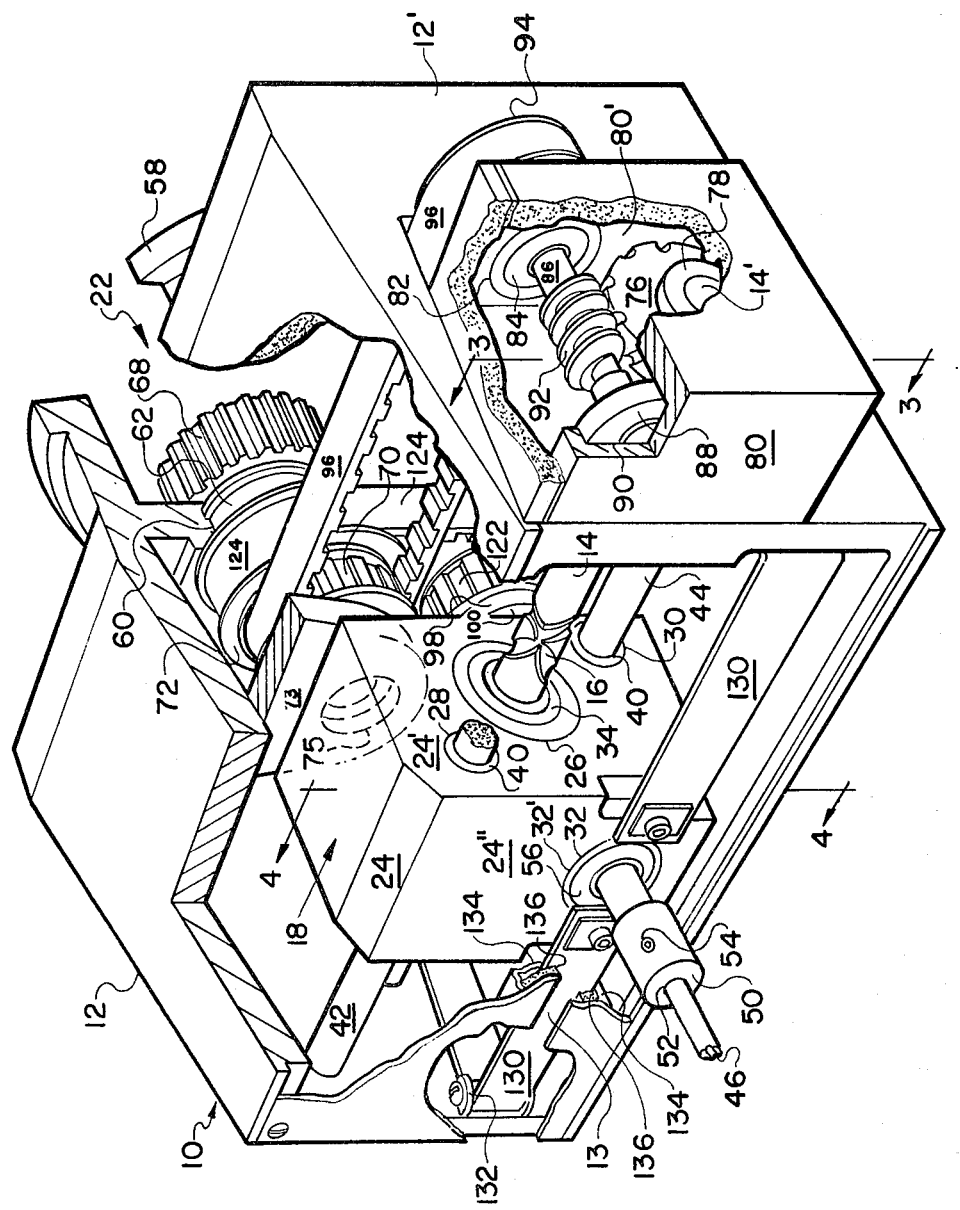
FIG. 1 is a right side front perspective view of a mortising apparatus according to the preferred embodiment of the present invention, with the frame of the apparatus shown broken away as necessary to enhance the illustration of the apparatus.
Figure 2:
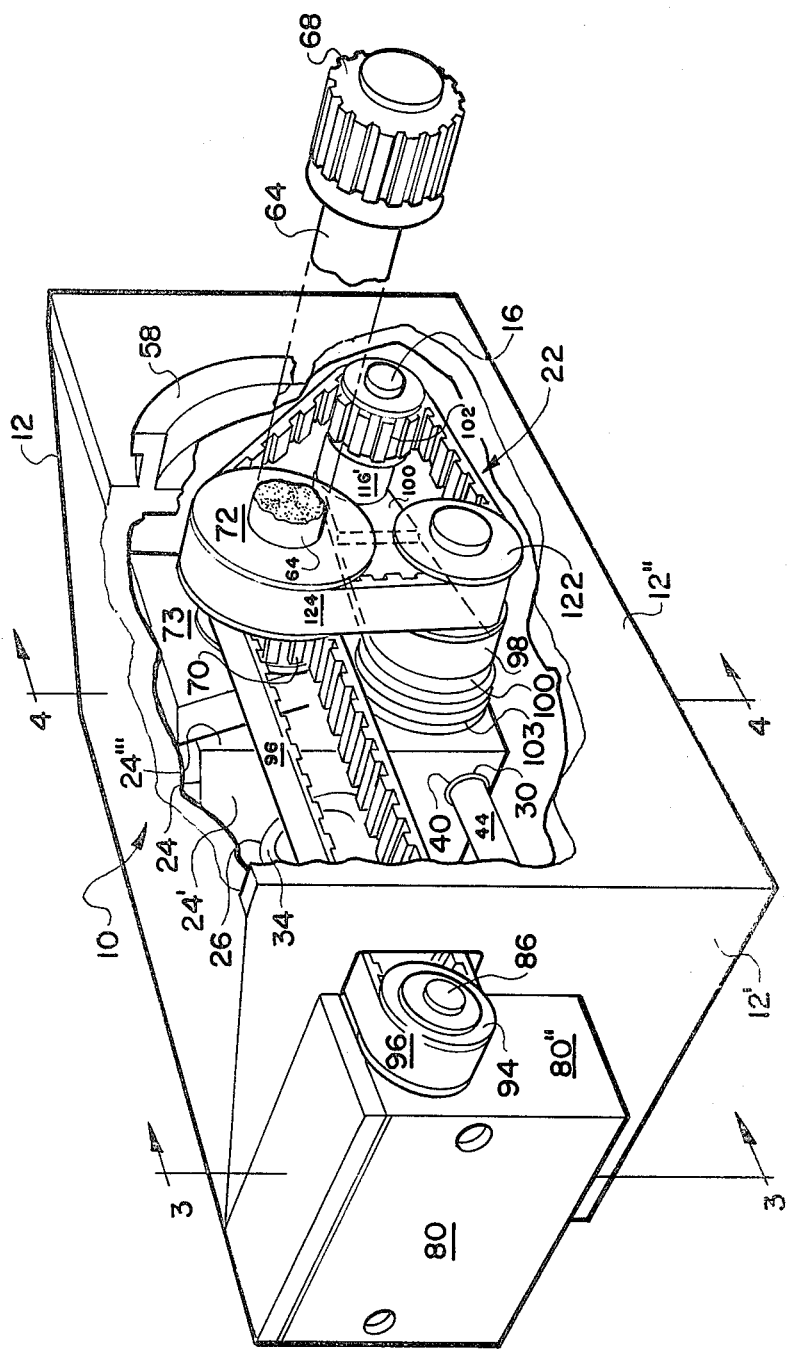
FIG. 2 is a right side rear perspective view of the mortising apparatus of FIG. 1.

Referring now to the accompanying drawings, the mortising apparatus of the present invention is indicated generally at 10 in FIGS. 1 and 2 in its preferred form as a relatively small woodworking unit adapted either for portable use to be operably joined with a conventional electric motor such as employed in other conventional woodworking machines, e.g. a lathe, or for permanent incorporation in a self-contained mortising machine. The conventional machines with which the mortising apparatus 10 may be employed are well known and the adaptability of the mortising apparatus 10 to such machines will be readily apparent to those skilled in the art. Such machines form no part of the present invention and, accordingly, they are not illustrated or described herein for sake of succinctness and clarity of description of the present invention. Similarly, the associated structure, such as a supporting base or track and a work table, which would be employed with the mortising apparatus 10 to provide a self-contained mortising machine are individually and collectively known in the prior art, any of which could satisfactorily function with the present mortising apparatus 10, and accordingly such associated structure is also not illustrated or described herein.

Basically, the mortising apparatus 10 includes a substantially enclosed casing or frame 12, a linear shaft 14 extending between and rotatably journalled in opposite side walls 12' of the frame 12, the shaft 14 having an endless helical groove 16 formed in its outer surface along its length, a router assembly 18 mounted on the shaft 14 in threaded engagement with the groove 16 thereof for reciprocal movement along the shaft 14 upon its rotation, the router assembly 18 rotatably carrying a spindle 20 which extends outwardly through a slot 13 in the front wall of the casing 12 alongside the shaft 14 and is adapted to hold a router bit 46 for wood cutting operation, and a belt-type driving arrangement, generally indicated at 22, particularly arranged for simultaneously rotating the shaft 14 and the spindle 20 for operation of the router assembly 18 for reciprocably cutting a linear mortised slot in wood.

Figure 5:
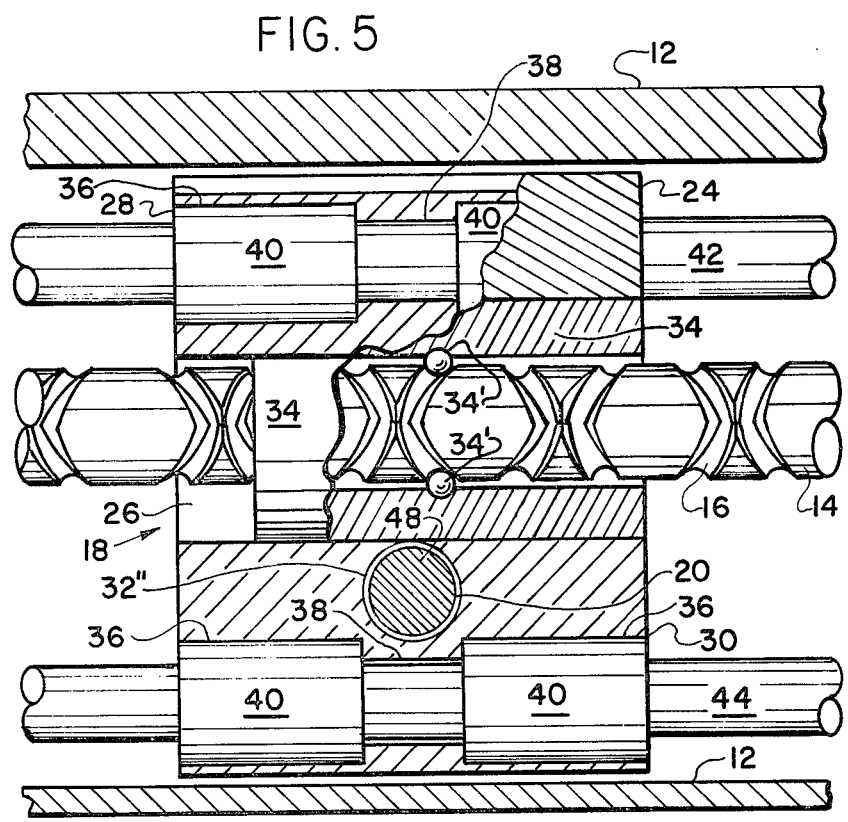
FIG. 5 is a vertical section of the apparatus of FIG. 1 taken along line 5—5 of FIG. 4.
Figure 4:
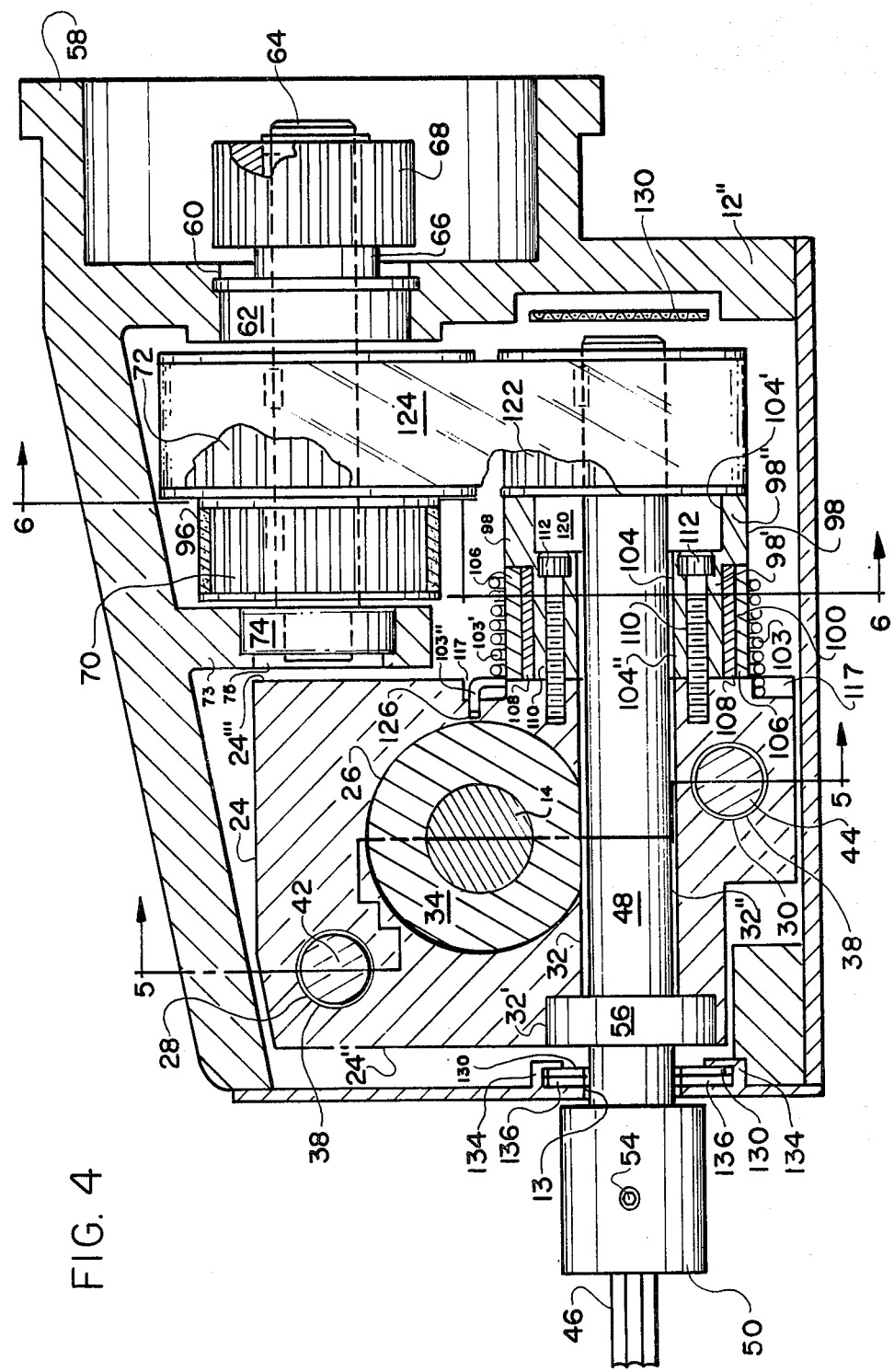
FIG. 4 is a vertical section of the apparatus of FIG. 1 taken along line 4—4 thereof.

The construction of the routor assembly 18 may best be understood with reference to FIGS. 4 and 5 and includes a substantially solid rectangular block 24 through which has been bored lengthwise thereof between the sides faces 24' a primary cylindrical bore 26 and two secondary cylindrical bores 28,30 parallel to and spaced from the primary bore 26, and through which has been bored widthwise between the front and rear faces 24",24'" perpendicularly to the bores 26,28,30 a cylindrical bore 32. The primary cylindrical bore 26 is of a constant diameter along its entire length and is snugly fitted with an annular feed nut 34 of conventional construction having a central cylindrical opening internally carrying a pair of ball bearing elements 34' appropriate for threaded engagement in the helical groove 16 of the shaft 14, the router assembly 18 being thusly mounted on the shaft 14 with the shaft 14 extending through the central opening of the feed nut 34 with the groove 16 in threaded engagement with the ball elements 34'. Each of the secondary bores 28,30 is of an enlarged diameter at 36 at its respective ends with a central area of smaller diameter at 38, the areas 36 of enlarged diameter being snugly fitted with annular cylindrical bearings 40, the secondary bores 28,30 thusly slidably receiving respectively therethrough cylindrical guide rods 42,44 which extend between the side walls 12' and the frame 12 in parallel relation with the shaft 14 at respective spacings therefrom and in respective relative positions thereto identical to the spacings of the secondary bores 28,30 from and relative positions thereof to the primary bore 26.

The cylindrical bore 32 extends through the block 24 intermediate the primary bore 26 and the secondary bore 30 and includes a section 32' of enlarged diameter recessed in the front face 24" and a linear section 32" of constant diameter extending therefrom to the rear face 24'". As hereinafter more fully described, an assembly of a stepped annular bearing support member 98 and an annular bearing 120 is affixed abuttingly to the rear face 24'" of the block 24 annularly about the bore section 32". The spindle 20 is formed as a cylindrical shaft 48 having at one end thereof an enlarged chuck 50 having an axial bore 52 therethrough and a set screw 54 radially extending into the bore 52 such that the chuck 50 may grip a conventional router bit 46. Inwardly of the chuck 50, the spindle 20 has rotatably affixed to its shaft 48 a bearing portion 56 of a slightly enlarged outer diameter relative to the remaining length of the spindle shaft 48. The spindle 20 is thusly received rotatably in the bore 32 with its chuck 50 extending outwardly from the front face 24" of the block 24, its bearing portion 56 snugly fitted in the recessed portion 32' of the bore 32 at the front face 24", and the remaining length of the spindle shaft 48 extending therefrom rearwardly through the bore 32, the stepped bearing support member 98 and the bearing 120 and extending outwardly therefrom.

The rear wall 12" of the frame 10 is formed with a fitting generally indicated at 58 to facilitate operative connection of the mortising apparatus 10 with an electric motor (not shown) as aforementioned. Centrally within the fitting 58, the rear wall 12" includes a circular opening 60 in which is snugly fitted an annular bearing 62 through which rotatably extends a drive shaft 64, the drive shaft 64 being formed intermediately thereof with an annular ridge 66 which abuts the outwardly facing side of the bearing 62. The inwardly extending end of the drive shaft 64 extends rotatably into another annular bearing 74 which is snugly fitted in a circular opening 75 in a wall 73 depending from the top side of the frame 12. An adapter gear 68 for providing driving connection with the motor is keyed to the portion of the drive shaft 64 extending outwardly of the frame 10 from the ridge 66 and two cog pulleys 70,72 are keyed side-by-side to the portion of the drive shaft 64 extending inwardly of the frame 10 from the bearing 62. As will be understood, the two cog pulleys 70,72 are driven rotatably with the drive shaft 64 by the electric motor with which the apparatus 10 is connected, the cog pulley 70 imparting driving force to the shaft 14 for rotating it, and the cog pulley 72 imparting driving force to the spindle 20 for rotating it, all as will be hereinafter more fully explained.

Figure 3:
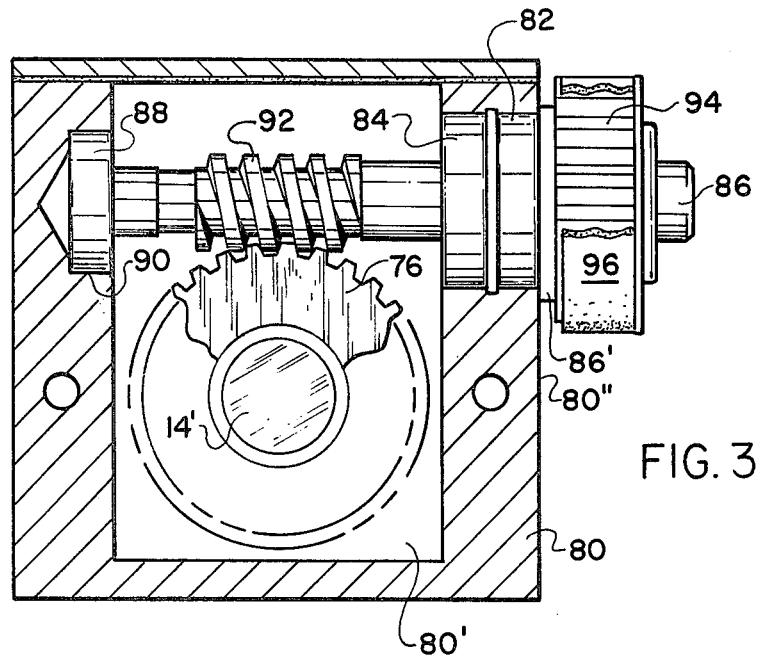
FIG. 3 is a vertical section of the apparatus of FIG. 1 taken along line 3—3 of FIG. 1.

As best seen in FIG. 3, a gear housing 80 is mounted on the outward face of the right side wall 12' of the frame 12 adjacent the shaft 14, one end 14' of the shaft 14 extending through the side wall 12' into a cavity 80' within the gear housing 80 with the end 14' of the shaft 14 extending rotatably into an annular bearing 78 snugly fitted in the gear housing 80. A worm gear 76 is keyed to the length of the shaft 14 extending within the cavity 80'. The cavity 80' of the gear housing 80 opens outwardly thereof through a circular opening 82 in the rearwardly facing side 80" of the gear housing 80 and an annular bearing 84 is snugly fitted in the circular opening 82. A cylindrical shaft 86 having an intermediate annular ridge 86' extends rotatably through the bearing 84 and into the cavity 80' with its ridge 86' abutting the outward surface of the bearing 84. The end of the shaft 86 within the cavity 80' is rotatably disposed within another annular bearing 88 fitted in a recess 90 in the wall of the cavity 80' opposite its opening 82. A worm 92 is keyed to the length of the shaft 86 extending within the cavity 80' between the bearings 84,88 and meshingly engages with the worm gear 76 for driving thereof. A cog pulley 94 is keyed to the shaft 86 along the length thereof extending outwardly of the gear housing 80 and a timing belt 96 is trained about the cog pulleys 70,94 for rotatably driving the shaft 86 and worm 92, and in turn the worm gear 76 and shaft 14, upon rotation of the drive shaft 64.

The aforementioned assembly of the stepped bearing support member 98 and the bearing 120 may best be seen in FIG. 4, an associated assembly of a pulley support arm 100 carrying a cog pulley 102, and a spring member 103 being rotatably disposed about the stepped bearing support member 98 abuttingly with the rear face 24''' of the block 24. The bearing support member 98 includes a primary annular portion 98' and an annular ridge 98'' of a greater diameter at the rearward end of the primary annular portion 98'. A central bore 104 extends centrally through the bearing support member 98 and includes a section 104' of enlarged diameter recessed in the radial end face of the annular ridge 98'' and a primary section 104'' of constant diameter extending from the recessed section 104' to the end face of the primary annular portion 98'.

Four bores 110 are formed axially through the primary annular portion 98' of the bearing support member 98 at ninety degree spacings circumferentially thereabout and the bores 110 are countersunk in the radial surface of the recessed section 104' of the bore 104, four appropriate screws 112 extending through the bores 110 and into the rear face 24''' of the block 24 annularly about the bore 32 to fixedly join the bearing support member 98 to the block 24 in the aforedescribed disposition. The annular bearing 120 is snugly fitted in the recessed section 104' in the bearing support member 98 in covering relation to the screws 112.

The pulley support arm 100 includes an annular hub portion 106 at one end thereof in which hub portion 106 is snugly fitted an annular bushing 108, the hub portion 106 and bushing 108 being rotatably disposed annularly about the primary annular portion 98' of the bearing support member 98. The other end of the pulley support arm 100 has formed therethrough a slot 114 through which extends a stub shaft 116. The stub shaft 116 has an annular ridge 116' formed intermediately thereon and is threaded at its end 116'' on one side of the ridge 116', the stub shaft 116 having its threaded end 116'' extending forwardly through the slot 114 with the ridge 116' abutting the rearward side of the pulley support arm 100 and a nut 118 threadedly tightened about the threaded end 116'' into abutment with the front face of the pulley support arm 100 to affix the stub shaft 116 to the pulley support arm 100. The cog pulley 102 is rotatably affixed to the length of the stub shaft 116 extending rearwardly on the other side of the ridge 116'.

The spring 103 is formed of a metal rod with a primary section 103' of a conventional helical coil spring construction, one end 103'' of the metal rod being bent to project outwardly from the primary helical section 103' and the other end 103''' of the metal rod extending tangentially outwardly from the primary helical section 103' and being curved semi-circularly. The spring 103 is disposed annularly about the hub portion 106 of the pulley support arm 100 and extends within a recess 117 formed in the rear face 24''' of the block 24 annularly about the stepped bearing member 98, the end 103'' projecting forwardly and extending into a hole 126 selectively formed in the block 24 within the recess 117 and the end 103''' extending along the length of the pulley support arm 100 with its curved portion engaged about the nut 118. A cog pulley 122 is keyed to the spindle shaft 48 adjacently rearwardly of the bearing 120 and an endless timing belt 124 is trained about the cog pulleys 72,102,122 for rotatably driving the spindle shaft 48 and in turn the chuck 50 thereon upon rotation of the drive shaft 64.

The operation of the mortising apparatus 10 will accordingly be understood. Initially, the apparatus 10 and its adapter gear 68 are appropriately connected with a suitable electric motor, and any necessary adjustments and/or positioning of the work to be mortised and/or any work support therefor are made as may be required by the particular application of the apparatus 10, all as will be understood by those skilled in the art. An appropriate router bit is fitted in the chuck 50 for cutting a slot of the desired depth and transverse width. Upon energization of the motor, the adapter gear 68 and the drive shaft 64 are rotated, effecting rotation of the two cog pulleys 70,72. Rotation of the cog pulley 70 is transmitted by the timing belt 96 to effect rotation of the cog pulley 94 and the shaft 86 to which it is keyed. The worm 92 is accordingly rotated with the shaft 86 and in turn drivingly rotates the worm gear 76, effecting rotation of the shaft 14. As the shaft 14 is rotated, its helical groove 16 acts as a cam track upon the feed nut 34 of the router assembly 18 causing the router assembly 18 to move reciprocably as a unit along the shaft 14 between the longitudinally outermost portions of the groove 16. As will be understood, the particular configuration and longitudinal extent of the groove 16 determine the length of the reciprocal stroke of the router assembly 18 and the present apparatus 10 is adapted for ready access to the shaft 14 and the gear housing 80 for easy replacement of the shaft 14 to vary the length of the reciprocal stroke of the router assembly 18. Simultaneously with the above-described rotational operation of the shaft 14 and resultant reciprocation of the router assembly 18, the rotation of the cog pulley 72 is transmitted by the timing belt 124 to effect rotation of the cog pulleys 102,122 and in turn the rotation of the spindle shaft 48 to which the cog pulley 122 is keyed, thereby effecting wood-cutting rotation of the chuck 50 and the router bit held therein.

According to a particular feature of the present mortising apparatus 10, the driving arrangement of the cog pulleys 72,102,122 and the timing belt 124 is adapted to extend and contract reciprocably with the reciprocation of the router assembly 18 to provide a continuous driving connection between the spindle shaft 48 throughout the reciprocal movement of the router assembly 18. Particularly, the assembly of the pulley support arm 100, its cog pulley 102 and the spring member 103 acts to cause the pulley 102 to move curvilinearly in association with the router assembly 18 during its reciprocation to continuously engage the timing belt 124 and maintain it taut during the extension and contraction of the arrangement of pulleys 72,102,122 and belt 124 to provide continuous and uniform driving transmission of the rotation of the cog pulley 72 to the cog pulley 122, all as may best be understood with reference to FIGS. 6–8 wherein the cog pulleys 72,102,122 and the router assembly 18 are illustrated at three different stages in the reciprocal stroke of the router assembly 18. As will be understood, the cog pulley 72 is non-movable other than rotatably with the drive shaft 64 while the cog pulley 122 not only rotates with the spindle shaft 48 but also reciprocates linearly with the block 24 of the router assembly 18. The respective axial shafts 64,48 of the cog pulleys 72,122 are spaced in parallel relation whereby the distance therebetween varies during the reciprocation of the router assembly 18 between a minimum distance when the router assembly 18 is in a central position along the shaft 14 wherein the pulleys 72,122 are vertically aligned (FIG. 6) and a maximum distance when the router assembly 18 is at either end of its stroke (FIGS. 7 and 8). The mounting of the pulley support arm 100 rotatably about the stepped bearing member 98 permits the pivoting of the pulley support arm 100 about the axial shaft 48 of the cog pulley 122 while the spring 103 acts biasingly through the nut 118 upon the outer end of the pulley support arm 100 to sufficiently urge the arm 100 pivotably about the shaft 48 in a counterclockwise direction (as viewed in FIGS. 6-8) away from the drive shaft 64 such that the cog pulley 102 will be disposed at a sufficient spacing relative to the cog pulley 72 at the central point in the reciprocal stroke of the router assembly 118 in which the cog pulleys 72,122 are most closely spaced so as to maintain sufficient tension in the timing belt 124 for driving operation thereof.

Figure 6:
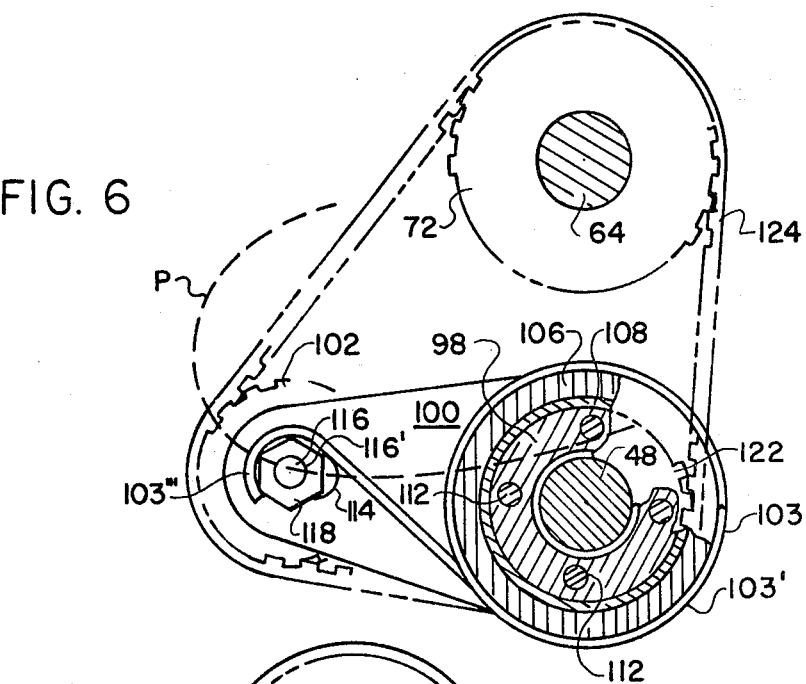
FIG. 6 is a vertical section of the apparatus of FIG. 1 taken along line 6—6 of FIG. 4.
Figure 7:
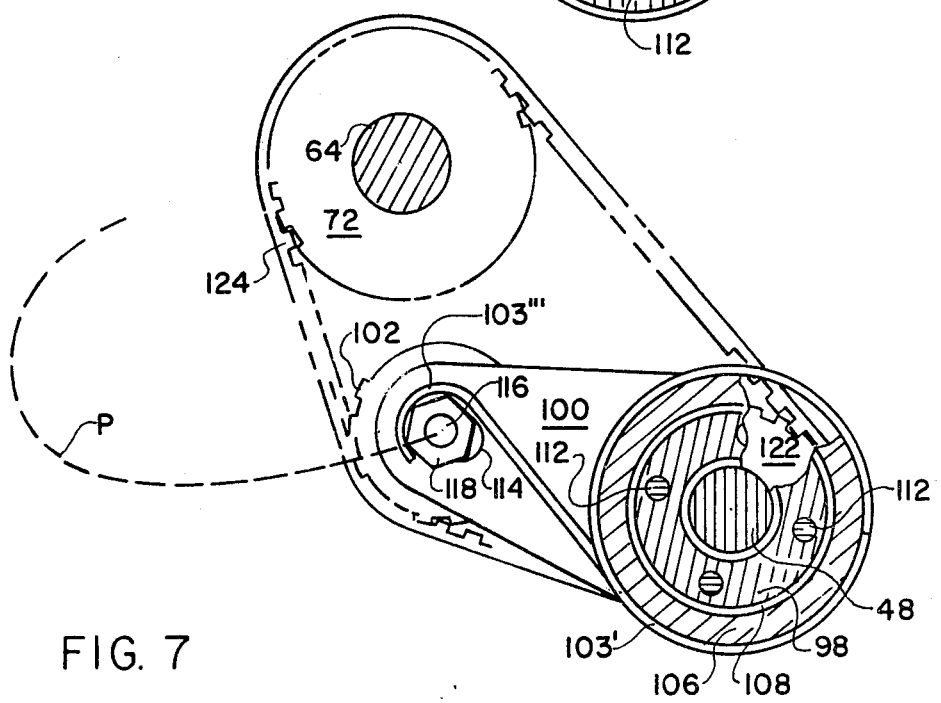
FIGS. 7 and 8 are vertical sections of the apparatus of FIG. 1 similar to FIG. 6 but illustrating the drive connection arrangement in different dispositions thereof.
Figure 8:
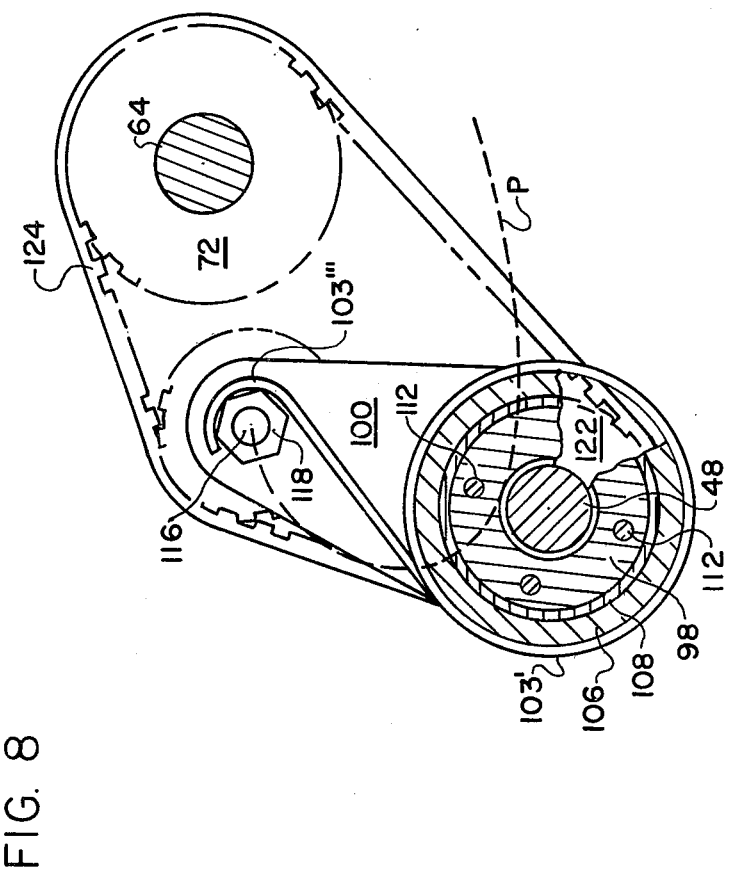

Thus, during reciprocal movement of the router assembly 18 between its central position of FIG. 6 and its most rightward position of FIG. 7, the increased spacing between the cog pulleys 72,122 creates correspondingly increased tension in the timing belt 124 which acts through the cog pulley 102, its shaft 116 and the nut 118 to deform the spring 103 to pivot the pulley support arm 100 progressingly clockwise to a degree in direct relation to the spacing between the cog pulleys 72,122 thereby to dissipate the increased tension in the timing belt 124. Similarly, during reciprocal movement of the router assembly 18 between its central position of FIG. 6 and its most leftward position of FIG. 8, the increased spacing between the cog pulleys 72,122 creates correspondingly increased tension in the timing belt 124 which acts through the cog pulley 102, its shaft 116 and the nut 118 to deform the spring 103 to pivot the pulley support arm 100 clockwise in direct relation to the spacing between the cog pulleys 72,122 thereby dissipating the increased belt tension. In this manner, as the router assembly 18 moves from end-to-end in its reciprocal stroke, the belt drive arrangement of the timing belt 12 and the pulleys 72,102,122 deformably extends and contracts reciprocably with the router assembly 18 to provide a continuous driving connection between the drive shaft 64 and the spindle shaft 48 throughout the reciprocal movement of the router assembly 18, the cog pulley 102 moving reciprocably in an curvilinear path represented in FIGS. 6-8 by the broken line P and thereby acting as a traveling idler pulley maintaining taut the timing belt 124 for continuous driving operation thereof during such extension and contraction of the driving connection of the pulleys 72,102,122 and timing belt 124.

As will be appreciated, the frame 12 of the mortising apparatus 10 is substantially enclosed on all sides except for the slot 13 in its front wall through which extends the spindle 20. As best seen in FIGS. 1 and 4, the slot 13 of the frame 12 is substantially sealed against debris by a length of a belt strap 130 which is affixed at its respective ends to the front face of the block 24 on opposite sides of the spindle bore 32 and is trained about pulleys 132 at each inside lower corner of the interior of the frame 12 to reciprocally travel along the interior wall surfaces thereof as the block 24 reciprocates along the grooved shaft 14. A small L-shaped angle member 134 is affixed to the interior surface of the front wall of the frame 12 immediately above and below the slot 13 and a felt strip 136 is affixed interiorly to the front wall of the frame 12 within each angle member 134 leaving a slight spacing between each felt strip 136 and its associated angle member 134. The upper and lower edges of the belt strap 130 respectively slide reciprocally within the spacings between the felt strips 136 and the angle members 134 in surface contact therewith and, in this manner, the interior of the frame 12 is kept substantially free of dust, dirt and other debris resulting from ordinary operation.

It will thus be understood that the present apparatus 10 uniquely provides a variable driving connection between a fixed drive shaft and a reciprocably moving router assembly 18 which will be appreciated solves certain problems affecting conventional mortising apparatus while further providing distinct advantages thereover. As previously noted, conventional mortising machines characteristically employ a unitarily constructed assembly of a drive motor and router bit mounted for reciprocation as a unit on a guide track or guide rod arrangement and this conventional construction has attendant disadvantages in the size of the apparatus and space required therefor and in the relatively limited applicability of the apparatus for functions other than forming mortised slots. The present invention, in contrast, solves these problems by permitting the utilization of a stationary motor and apparatus framework which correspondingly reduces the space necessary for operation of the apparatus since the motor does not reciprocate and further permits the adaptation of the present apparatus as a convenient portable attachment to other types of woodworking apparatus which employ stationary motors thereby eliminating the need for and capital investment in a separate mortising apparatus. Conveniently, the present apparatus is small and lightweight, being only approximately eleven inches in length, seven and one-half inches in width, and five and one-half inches in height and weighing less than thirty-five pounds in the illustrated embodiment.

The present invention has been described in detail above for purposes of illustration only and is not intended to be limited by this description or otherwise to exclude any variation or equivalent arrangement that would be apparent from, or reasonably suggested by the foregoing disclosure to the skill of the art.

I claim:

1. A mortising apparatus for cutting longitudinal slots in a work piece, comprising a frame, a longitudinal, threaded shaft rotatably journaled in said frame, means threadedly mounted on said shaft for longitudinal reciprocation therealong upon rotation thereof, means for cutting said work piece rotatably journaled in and extending outwardly from said reciprocation means, a drive shaft rotatably journaled in said frame, and drive connection means operatively associating said drive shaft respectively with said threaded shaft and with said cutting means for simultaneously rotating each thereof upon rotation of said drive shaft to cause said reciprocation means to reciprocate longitudinally along said threaded shaft while causing said cutting means to rotate, said drive connection means including idler means reciprocably translatable with said reciprocation means for maintaining uniform drive association between said drive shaft and said cutting means throughout reciprocation thereof, whereby said cutting means is effective for cutting longitudinal slots with said cutting means.

2. A mortising apparatus according to claim 1 and characterized further in that said drive connection means includes first means driven by said drive shaft for rotating said threaded shaft and second means driven by said drive shaft for rotating said cutting means.

3. A mortising apparatus according to claim 2 and characterized further in that said first driven means includes worm gear means operatively associated with said threaded shaft for effecting rotation thereof and belt drive means driven by said drive shaft for driving said worm gear means.

4. A mortising apparatus according to claim 2 or 3 and characterized further in that said second driven means includes second belt drive means arranged in driving association with said drive shaft and said cutting means for extension and contraction reciprocably with said reciprocation means for rotating said cutting means throughout its reciprocating movement with said reciprocation means.

5. A mortising apparatus according to claim 4 and characterized further in that said second belt drive means includes a drive belt extending between said drive shaft and said cutting means and idler pulley means arranged for traveling movement in engagement with said drive belt reciprocably with said reciprocation means for maintaining taut said drive belt as said second belt drive means extends and contracts.

6. A mortising apparatus according to claim 5 and characterized further in that said idler pulley means is movably mounted on said reciprocation means for movement in a curvilinear path relative to said drive shaft and said cutting means during reciprocation of said reciprocation means.

7. A mortising apparatus according to claim 6 and characterized further in that said idler pulley means includes a pulley support arm pivotably mounted on said reciprocation means, a pulley rotatably mounted on said pulley support arm at a spacing from the pivot axis thereof and biasing means for urging said pulley support arm away from said drive shaft.

8. A mortising apparatus according to claim 7 and characterized further in that said pulley support arm is mounted pivotably about the axis of rotation of said cutting means.

9. A mortising apparatus according to claim 8 and characterized further in that said second belt drive means includes a pulley fixedly mounted on said drive shaft for rotation therewith and a pulley fixedly mounted on said cutting means for rotation and reciprocation therewith, said drive belt being trained respectively about said drive shaft pulley, said cutting means pulley, and said idler pulley for rotation of each thereof upon rotation of said drive shaft.

10. A mortising apparatus according to claim 9 and characterized further in that said threaded shaft includes an endless helical groove formed along the surface thereof for controlling longitudinal reciprocation of said reciprocation means and said cutting means includes a wood-cutting router bit.

11. A mortising apparatus according to claim 1 and characterized further in that said frame substantially encloses said threaded shaft, said reciprocation means, said cutting means, said drive shaft and said drive connection means, said frame including a longitudinal opening therein for extension outwardly therethrough and reciprocation therein of said cutting means and belt means being affixed to said reciprocation means in covering relation to said opening on opposite sides of said cutting means for reciprocal movement with said reciprocation means to prevent entrance of debris into said frame through said opening.

12. A mortising apparatus according to claim 11 and characterized further in that said belt means includes a belt strap affixed at its opposite ends respectively to said reciprocation means on said opposite sides of said cutting means and trained interiorly of said frame about pulley means for reciprocation with said reciprocation means.

13. A compact portable mortising head adapted to be selectively mounted in driven association with a driving motor of a woodworking machine or the like for cutting longitudinal slots in a work piece, comprising a substantially enclosed frame, a longitudinal, threaded shaft rotatably journaled in said frame, means threadedly mounted on said shaft for longitudinal reciprocation therealong upon rotation thereof, bit means for cutting said work piece rotatably journaled in and extending outwardly of said frame from said reciprocation means about an axis transverse to said threaded shaft, a drive shaft rotatably journaled in said frame, mounting means for operatively connecting said drive shaft in driven relation with said driving motor, and drive connection means operatively associating said drive shaft in driving relation respectively with said threaded shaft and with said bit means for simultaneously rotating each thereof upon rotation of said drive shaft to cause said reciprocation means to reciprocate longitudinally along said threaded shaft while causing said bit means to rotate in said reciprocation means, said drive connection means including first means driven by said drive shaft for rotating said threaded shaft and second means driven by said drive shaft for rotating said bit means and said second driven means including idler means reciprocably translatable with said reciprocation means for maintaining uniform driven association between said drive shaft and said bit means throughout reciprocation thereof, thereby for cutting longitudinal slots with said bit means.

* * * * *